(12) United States Patent
Wilber (10) Patent No.: US 10,227,991 B2
(45) Date of Patent: Mar. 12, 2019

(54) ROTOR HUB SEAL

(71) Applicant: United Technologies Corporation, Farmington, CT (US)

(72) Inventor: John E. Wilber, East Hampton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 486 days.

(21) Appl. No.: 14/991,015

(22) Filed: Jan. 8, 2016

(65) Prior Publication Data

US 2017/0198708 A1    Jul. 13, 2017

(51) Int. Cl.

| F01D 11/00 | (2006.01) |
|---|---|
| F01D 11/02 | (2006.01) |
| F01D 5/08 | (2006.01) |
| F01D 25/12 | (2006.01) |
| F04D 29/08 | (2006.01) |
| F04D 29/16 | (2006.01) |

(Continued)

(52) U.S. Cl.
CPC ............. *F04D 29/083* (2013.01); *F01D 5/08* (2013.01); *F01D 11/001* (2013.01); *F01D 11/003* (2013.01); *F01D 11/02* (2013.01); *F01D 25/12* (2013.01); *F04D 29/164* (2013.01); *F04D 29/324* (2013.01); *F04D 29/582* (2013.01); *F04D 29/584* (2013.01); *F04D 29/542* (2013.01); *F05D 2220/32* (2013.01); *F05D 2230/60* (2013.01); *F05D 2240/55* (2013.01); *F05D 2260/201* (2013.01); *F05D 2260/202* (2013.01); *F05D 2260/30* (2013.01); *Y02T 50/676* (2013.01)

(58) Field of Classification Search
CPC ........ F01D 5/08; F01D 11/001; F01D 11/003; F01D 25/12; F04D 29/083; F04D 29/324; F04D 29/582; F05D 2260/201; F05D 2260/202; F05D 2260/30; F05D 2220/32
See application file for complete search history.

(56) References Cited

U.S. PATENT DOCUMENTS

| 2,988,325 A | 6/1961 | Dawson |
|---|---|---|
| 7,407,369 B2 | 8/2008 | Schwarz et al. |

(Continued)

FOREIGN PATENT DOCUMENTS

| CA | 2603494 | 4/2008 |
|---|---|---|

OTHER PUBLICATIONS

The Extended European Search Report for EP Application No. 17150169.5, dated May 10, 2017.

*Primary Examiner* — Ninh H Nguyen
*Assistant Examiner* — Brian P Wolcott
(74) *Attorney, Agent, or Firm* — Carlson, Gaskey & Olds, P.C.

(57) ABSTRACT

A gas turbine engine includes a rotor hub which includes a substantially axially extending projection and a substantially radially extending projection. A seal ring includes a body portion and at least one knife edge that extends outward from the body portion. A recess is in the body portion for accepting the axially extending portion of the rotor hub. The seal ring includes at least one cooling passage that extends through the seal ring. A lock ring is in abutting contact with the seal ring and the radially extending projection on the rotor hub for securing the seal ring to the rotor hub.

17 Claims, 6 Drawing Sheets

(51) Int. Cl.
*F04D 29/32* (2006.01)
*F04D 29/58* (2006.01)
F04D 29/54 (2006.01)

(56) References Cited

U.S. PATENT DOCUMENTS

| | | | |
|---|---|---|---|
| 8,408,866 B2* | 4/2013 | Weaver | F01D 5/082 |
| | | | 415/1 |
| 8,517,666 B2* | 8/2013 | Alvanos | F01D 5/081 |
| | | | 415/115 |
| 8,740,554 B2 | 6/2014 | Virkler et al. | |
| 8,864,466 B2* | 10/2014 | Belmonte | F01D 5/081 |
| | | | 416/96 R |
| 9,051,847 B2* | 6/2015 | Aiello | F01D 11/001 |
| 9,091,173 B2 | 7/2015 | Mosley et al. | |
| 9,097,129 B2* | 8/2015 | Aiello | F01D 11/001 |
| 9,109,450 B2 | 8/2015 | Hummel et al. | |
| 9,169,737 B2* | 10/2015 | Aiello | F01D 11/001 |
| 2007/0059158 A1 | 3/2007 | Alvanos et al. | |
| 2008/0260523 A1 | 10/2008 | Alvanos et al. | |
| 2010/0124483 A1 | 5/2010 | Weaver et al. | |
| 2010/0124495 A1* | 5/2010 | Bifulco | F01D 5/066 |
| | | | 415/216.1 |
| 2011/0193293 A1 | 8/2011 | Mega et al. | |
| 2013/0259659 A1* | 10/2013 | Knaul | F16J 15/4472 |
| | | | 415/170.1 |
| 2013/0323029 A1 | 12/2013 | Aiello et al. | |
| 2016/0298640 A1* | 10/2016 | Wilber | F04D 29/083 |

* cited by examiner

ROTOR HUB SEAL

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

When the high-speed exhaust gas flow expands in the turbine section, turbine rotor blades rotate the spool and turn compressor blades attached to another end of the spool in the compressor section to compress the air entering the combustor section. In order to increase the efficiency of the compressor section and the turbine section, seals are utilized to retain the airflow in the core path to prevent losses in the compressor section and turbine section by restricting flow out of the core flow path.

SUMMARY

In one exemplary embodiment, a gas turbine engine includes a rotor hub which includes a substantially axially extending projection and a substantially radially extending projection. A seal ring includes a body portion and at least one knife edge that extends outward from the body portion. A recess is in the body portion for accepting the axially extending portion of the rotor hub. The seal ring includes at least one cooling passage that extends through the seal ring. A lock ring is in abutting contact with the seal ring and the radially extending projection on the rotor hub for securing the seal ring to the rotor hub.

In a further embodiment of the above, at least one cooling passage includes at least one of an impingement cooling passage and a film cooling passage.

In a further embodiment of any of the above, a plenum is at least partially defined by the rotor hub and the seal ring.

In a further embodiment of any of the above, a feed passage is in the rotor hub and is in fluid communication with the plenum.

In a further embodiment of any of the above, at least one cooling passage extends in a radially outward direction.

In a further embodiment of any of the above, an axially downstream-most surface on the seal ring is located upstream of a contact surface on the lock ring.

In a further embodiment of any of the above, a radially innermost surface on the seal ring is located radially outward from a radially outermost surface on the radially extending projection.

In a further embodiment of any of the above, a rotor disk supports a plurality of rotor blades.

In a further embodiment of any of the above, the rotor hub abuts the rotor disk at an axially forward end and a spool on an axially downstream end.

In a further embodiment of any of the above, the rotor hub tapers from an axially upstream end toward an axially downstream end.

In another exemplary embodiment, a seal assembly for a gas turbine engine includes a seal ring that includes a body portion which includes a recess in the body portion for accepting a portion of a rotor hub on an axially upstream end. At least one knife edge extends outward from the body portion. At least one cooling passage extends through the seal ring and a stop extends from a downstream end of the body portion for engaging a lock ring.

In a further embodiment of any of the above, a rotor hub has a substantially axially extending projection and a substantially radially extending projection. The axially extending projection is accepted within the recess in the seal ring.

In a further embodiment of any of the above, at least one cooling passage includes at least one of an impingement cooling passage and a film cooling passage.

In a further embodiment of any of the above, a plenum is at least partially defined by the rotor hub and the seal ring.

In a further embodiment of any of the above, a feed passage is in the rotor hub and is in fluid communication with the plenum.

In a further embodiment of any of the above, the rotor hub includes a rotor disk contact surface on an axially upstream portion for contacting a rotor disk and a spool contact surface on an axially downstream portion for contacting a spool.

In a further embodiment of any of the above, at least one cooling passage extends in a radially outward direction.

DETAILED DESCRIPTION

Figure 1:
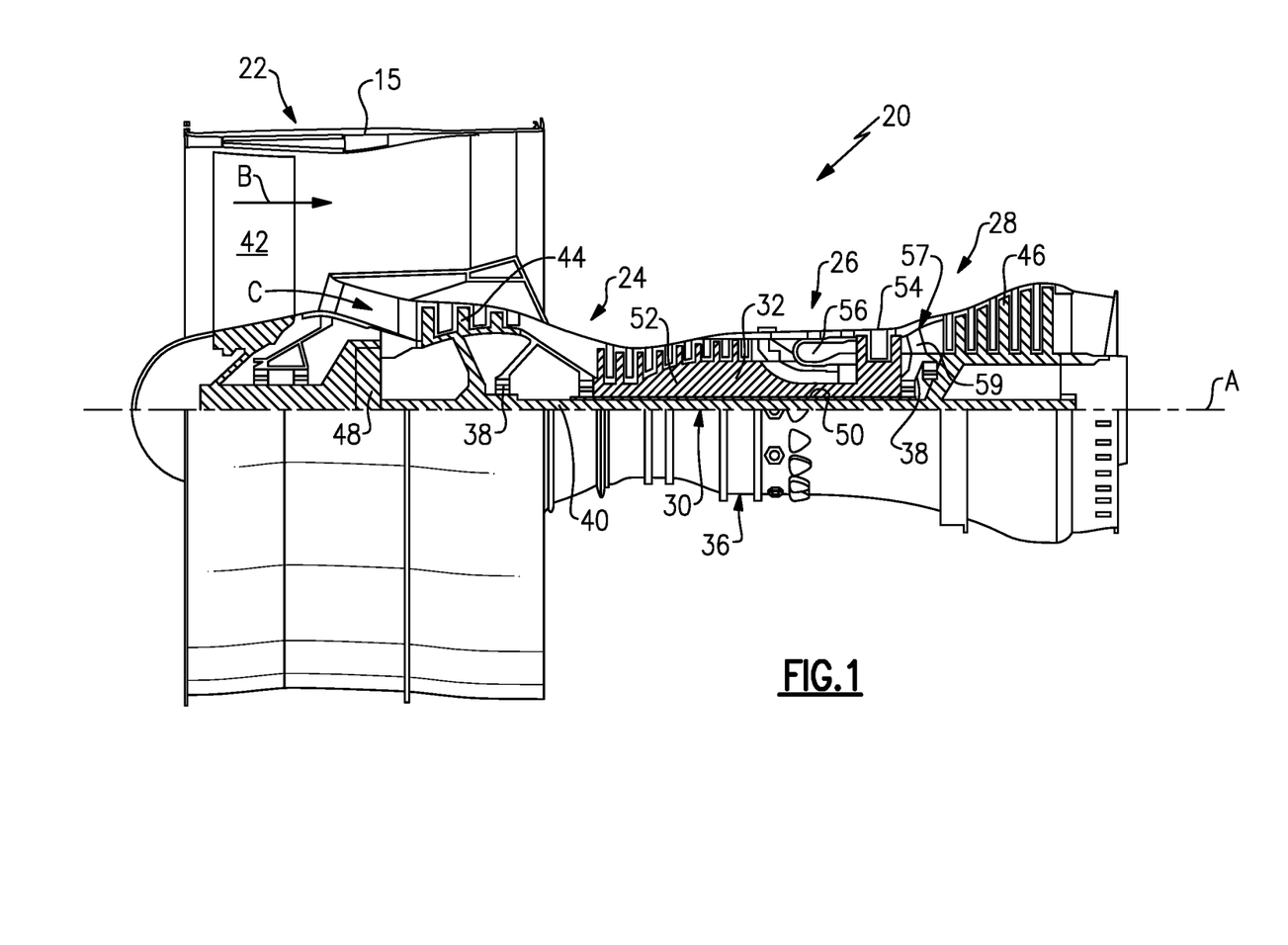
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 meters/second).

The example gas turbine engine includes fan 42 that comprises in one non-limiting embodiment less than about twenty-six (26) fan blades. In another non-limiting embodiment, fan section 22 includes less than about twenty (20) fan blades. Moreover, in one disclosed embodiment low pressure turbine 46 includes no more than about six (6) turbine rotors schematically indicated at 34. In another non-limiting example embodiment low pressure turbine 46 includes about three (3) turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2:
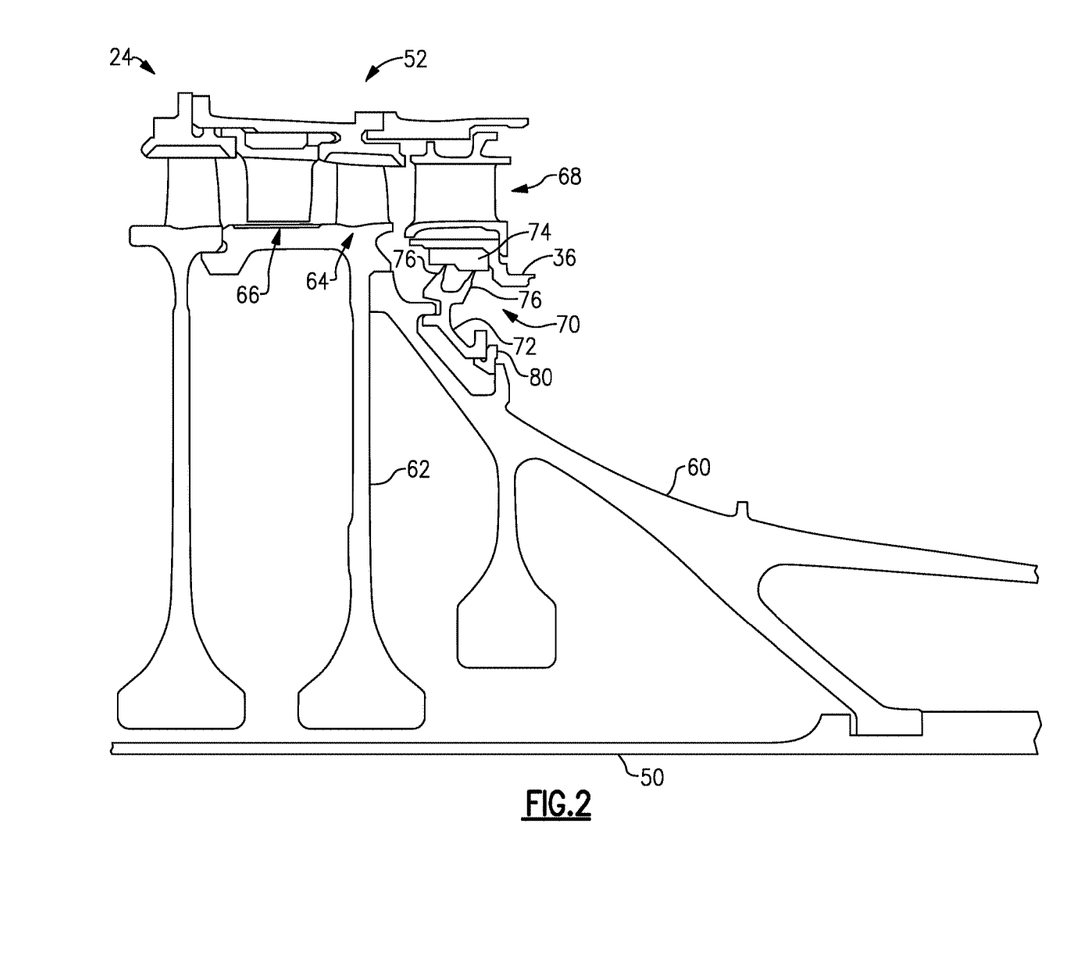
FIG. 2 is an enlarged view of a portion of the compressor section of the gas turbine engine shown in FIG. 1.

FIG. 2 illustrates an enlarged view of a portion of the compressor section 24 including a rotor hub 60. In the illustrated embodiment, the rotor hub 60 forms a portion of the high pressure compressor 52 and rotates with the outer shaft 50. Although the rotor hub 60 is illustrated as being part of the high pressure compressor 52, the rotor hub 60 could be used in other portions of the compressor section 24 or in the turbine section 28.

An upstream portion of the rotor hub 60 includes a portion contacting a rotor disk 62 located axially upstream from the rotor hub 60 and a downstream portion of the rotor hub 60 includes a portion contacting the inner shaft 50. In this disclosure, axial or axially is in relation to the engine axis A unless stated otherwise. The rotor disk 62 is attached to an array of rotor blades 64 that rotate with the outer shaft 50 along with the rotor hub 60. Axially upstream of the array of rotor blades 64 are an array of vanes 66 forming a stator between axially adjacent arrays of rotor blades 64. Additional arrays of vanes 66 and rotor blades 64 can be located in the high pressure compressor 52. Axially downstream of the array of rotor blades 64 are guide vanes 68 for directing the airflow leaving the high pressure compressor 52 and entering the combustor section 26.

In order to direct the airflow past the guide vanes 68, a seal 70 is used to restrict the flow of the compressed air in order to reduce leakage. The seal 70 includes at least one of a portion of the rotor hub 60, a seal ring 72, a lock ring 80, and a mating surface 74, such as a honeycomb seal or an abradable material. The seal ring 72 and the lock ring 80 are fixed to rotate with the rotor hub 60 and the mating surface 74 is fixed from rotation on a portion of the engine static structure 36.

In the illustrated embodiment, the seal ring 72 includes a pair of knife edge seals 76 that extend radially outward and downstream from the seal ring 72 toward the mating surface 74. In this disclosure, upstream or downstream is in relation to the airflow path traveling through the gas turbine engine 20. In the illustrated embodiment, the mating surface 74 also includes a pair of radially spaced surfaces that each correspond to one of the pair of knife edge seals 76. In this disclosure, radial or radially is in relation to the engine axis A unless stated otherwise.

Figure 3:
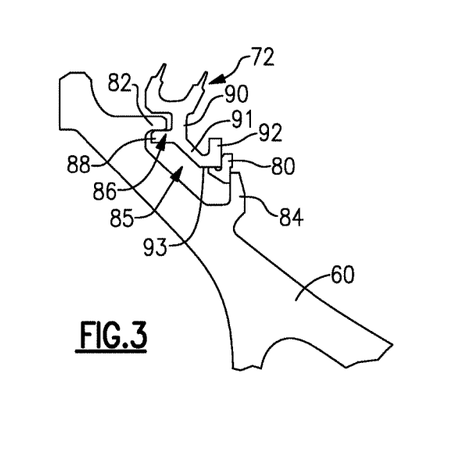
FIG. 3 is an enlarged view of a rotor hub of the compressor section shown in FIG. 2.

As illustrated in FIG. 3, the seal ring 72 is fixed to the rotor hub 60 utilizing an interference fit between the seal ring 72 and the rotor hub 60 in addition to the lock ring 80. The rotor hub 60 includes an axially extending projection 82 and a radially extending projection 84 located axially downstream and radially inward from the axially extending projection 82. In the illustrated embodiment, the axially and radially extending projection 82, 84 are spaced from an upstream-most end of the rotor hub 60 and partially define a cavity 85 with a portion of the rotor hub 60, the seal ring 72, and the lock ring 80.

The seal ring 72 includes a recess 86 for accepting the axially extending projection 82. The recess 86 is at least partially defined by an axially extending projection 88 extending from a body portion 90 of the seal ring 72. In the illustrated example, the axially extending projection 82 on the rotor hub 60 extends in an axially downstream direction and the axially extending projection 88 on the seal ring 72 extends in an axially upstream direction. The axially extending projection 88 is also located radially inward from the axially extending projection 82.

Figure 4:
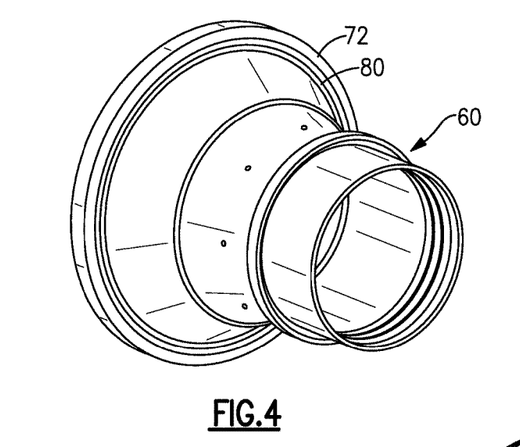
FIG. 4 is a perspective view of the rotor hub shown in FIG. 3 with a seal ring and a lock ring.
Figure 5:
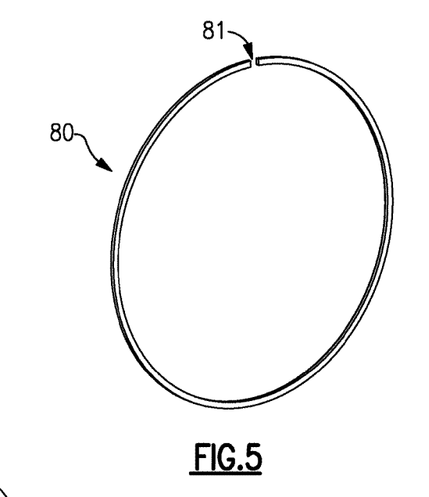
FIG. 5 is a perspective view of the lock ring shown in FIG. 4.
Figure 6:
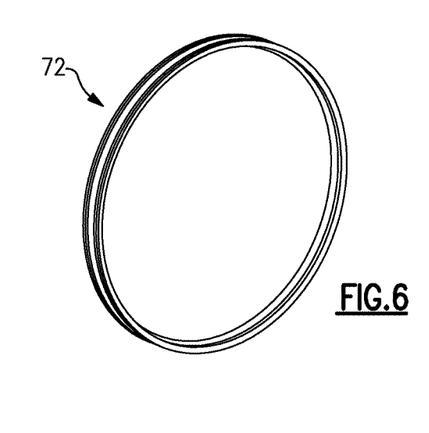
FIG. 6 is a perspective view of the seal ring shown in FIG. 4.

As shown in FIGS. 4-6, the rotor hub 60 and the seal ring 72 form a completed and continuous loop in the circumferential direction while the lock ring 80 includes a discontinuity 81 in the circumferential direction. The discontinuity 81 allows the lock ring 80 to expand or contract as needed to secure the seal ring 72 to the rotor hub 60. The rotor hub 60 also includes a truncated conical shape tapering from an axially upstream end towards an axially downstream end of the rotor hub 60 with a larger tapering occurring adjacent the upstream end compared to the downstream end.

The seal ring 72 also includes a leg portion 91 extending from the body portion 90 in a direction having a major component following a profile of the adjacent rotor hub 60. A radially inward and axially downstream end of the leg portion 91 on the seal ring 72 includes a radially outward extending projection 92. The radially inward and axially downstream end of the leg portion 91 also includes an axially extending surface 93 that includes a larger radius from the engine axis A than a radially outermost surface of the radially extending projection 84 on the rotor hub 60 to facilitate assembly of the seal ring 72 onto the rotor hub 60.

Figure 7:
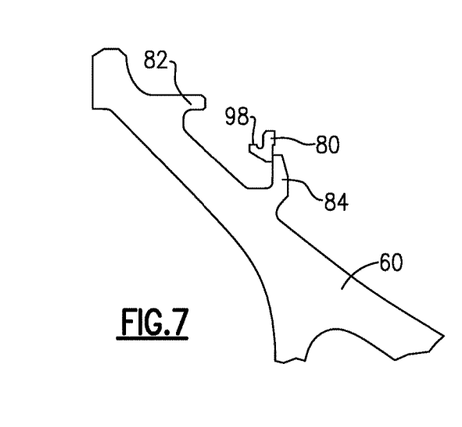
FIGS. 7-11 illustrate an example method of attaching the seal ring and lock ring to the rotor hub.
Figure 8:
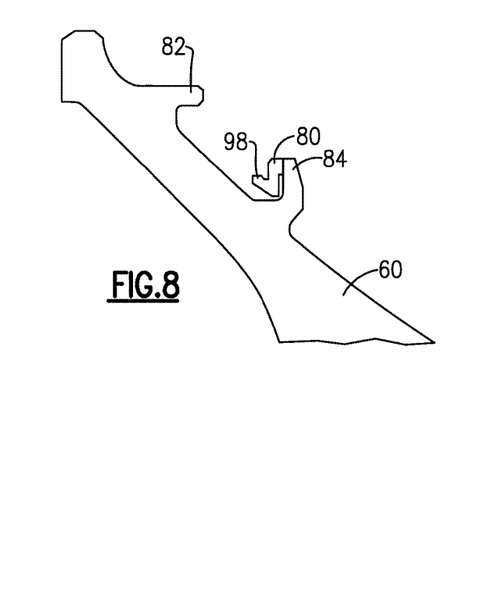

As shown in FIG. 7, the seal 70 is installed on the rotor hub 60 by expanding the lock ring 80 to fit around the radially extending projection 84 and moving the lock ring 80 axially forward past the radially extending projection 84. Once the lock ring 80 has moved past the radially extending projection 84, the lock ring 80 is compressed such that a radially outermost portion of the lock ring 80 is aligned with a radially outermost surface of the radially extending projection 84 as shown in FIG. 8.

Figure 9:
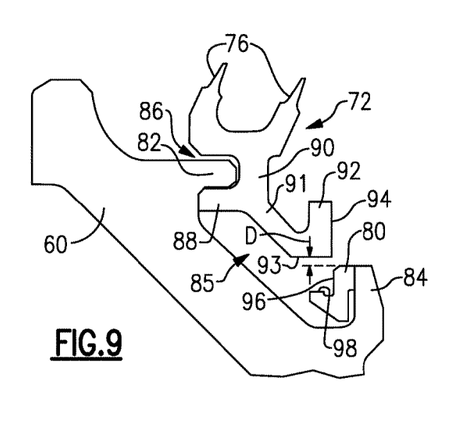

As shown in FIG. 9, a clearance distance D is created between a radially innermost portion of the seal ring 72 and the radially outermost portion of the lock ring 80 and the radially extending projection 84. The clearance distance D allows the seal ring 72 to move axially forward past the lock ring 80 and the radially extending projection 84 as well as providing sufficient room for the seal ring 72 to clear a tool compressing the lock ring 80. The axially extending projection 82 on the rotor hub 60 is accepted into the recess 86 on the seal ring 72 as the seal ring 72 enters the cavity 85. The seal ring 72 is moved axially forward at least until an axially downward facing surface 94 on the radially outward extending projection 92 is spaced axially forward of an axially upstream facing surface 96 on the lock ring 80 forming a stop on the seal ring 72.

Figure 10:
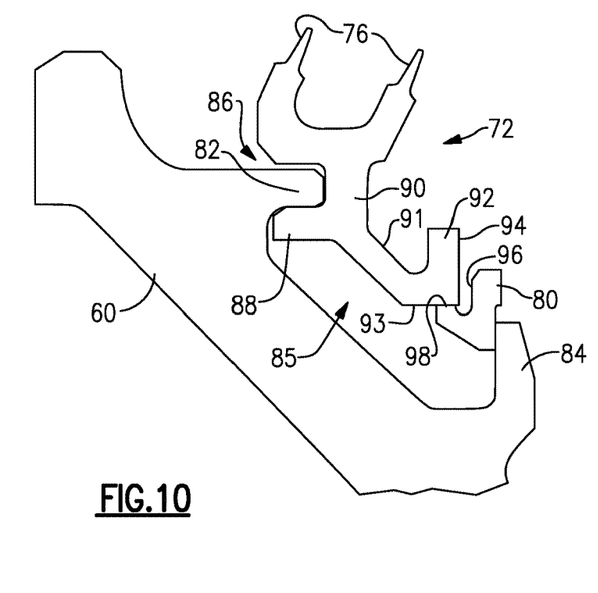
Figure 11:
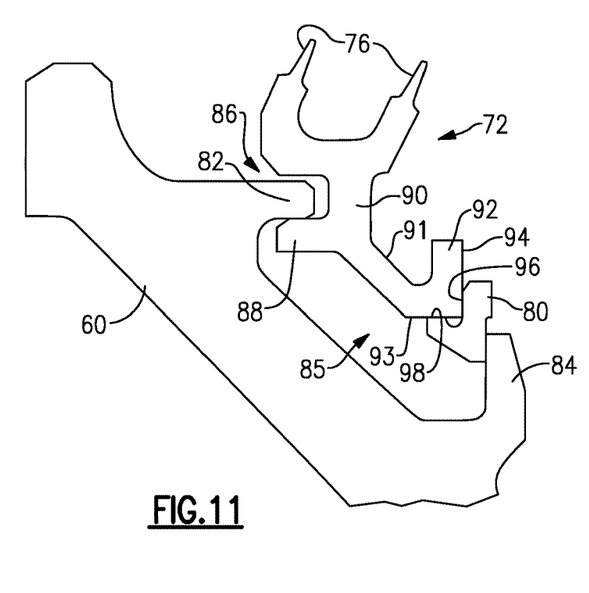

Once, the axially downward facing surface 94 on the seal ring 72 is spaced axially forward of the axially upstream facing surface 96 on the lock ring 80, the compression on the lock ring 80 is released allowing the lock ring 80 to expand radially outward as shown in FIG. 10. A stop surface 98 on the lock ring 80 engages the axially extending surface 93 on the seal ring 72 to prevent the lock ring 80 from separating relative to the seal ring 72 and the rotor hub 60. The radially outward expansion of the lock ring 80 at least partially radially aligns the axially downward facing surface 94 and the axially upstream facing surface 96 to secure the seal ring 72 to the rotor hub 60. The seal ring 72 can then be moved in an axially downstream direction to lock the seal ring 72 against the lock ring 80 to ensure proper placement of the seal ring 72 relative to the rotor hub 60 and the lock ring 80.

By removeably attaching the seal 70 including the knife edge seals 76 to the rotor hub 60, the effective life of the rotor hub 60 will not be limited by the effective life of the knife edge seals 76 because the knife edge seals 76 can be removed and replaced without needing to replace the entire rotor hub 60. This allows the remainder of the rotor hub 60 remain in service on the gas turbine engine which reduces maintenance costs and prevents the rotor hub 60 from being discarded based on the effective life of the knife edge seals 76.

Figure 12:
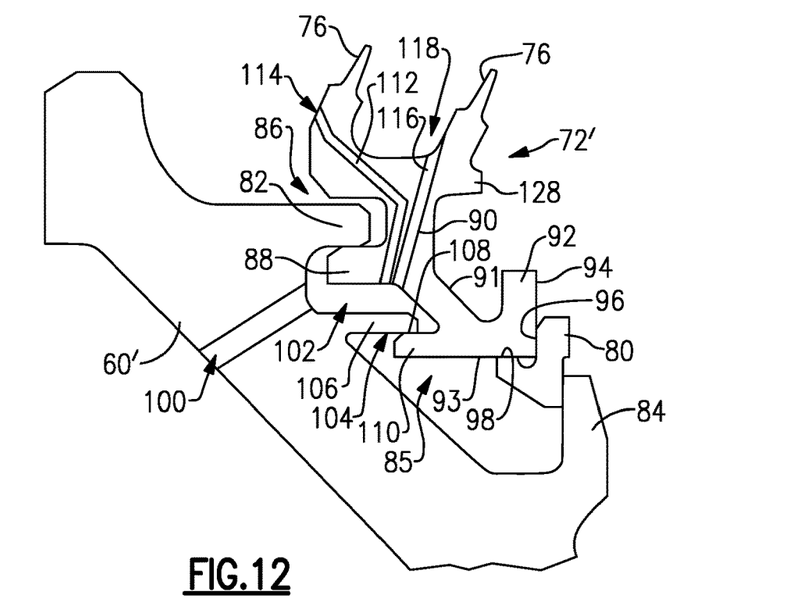
FIG. 12 is a cross-sectional view of a seal ring and a rotor hub according to a second embodiment.
Figure 13:
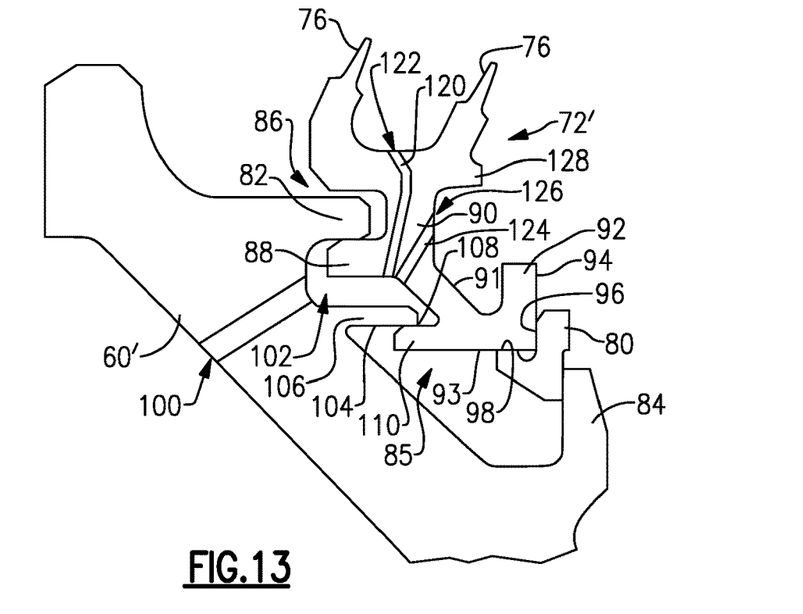
FIG. 13 is another cross-sectional view of the seal ring and rotor hub of FIG. 12.

FIGS. 12 and 13 illustrate a cross-sectionals view of a seal ring 72' and a rotor hub 60' according to a second non-limiting embodiment taken at different circumferential locations along the seal ring 72' and the rotor hub 60'. The seal ring 72' and the rotor hub 60' are substantially similar to the seal ring 72 and the rotor hub 60, respectively, described above except where described below or shown in the Figures. The seal ring 72' and the rotor hub 60' provide additional cooling to the knife edge seals 76, which extends the service life of the knife edge seals 76.

The rotor hub 60' includes a feed passage 100 extending through a wall of the rotor hub 60'. Although FIGS. 12 and 13 only depict a single feed passage 100, multiple feed passages 100 are spaced circumferentially around the rotor hub 60'. In the illustrated embodiment, the feed passage 100 is substantially perpendicular to an exterior surface of the rotor hub 60'. Substantially perpendicular in the illustrated embodiment is within twenty (20) degrees of being perpendicular to the exterior surface of the rotor hub 60'. Cooling air from the high pressure compressor 52 is bled off from a stage upstream of the rotor hub 60' to provide a positive pressure for the cooling air to travel through the feed passage 100 in the rotor hub 60'.

Once the cooling air has passed through the feed passage 100, the cooling air reaches a plenum 102. The plenum 102 is at least partially defined by the rotor hub 60' and the seal ring 72'. A first seal for the plenum 102 is created by the interface of the axially extending projections 82 and 88 adjacent an upstream end of the plenum 102. A second seal for the plenum 102 is created between a first seal face 104 on a second axially extending projection 106 and a corresponding second seal face 108 on an axially forward extending projection 110 on the seal ring 72' adjacent a downstream end of the plenum 102. The first and second seals formed by the interface of the rotor hub 60' and the seal ring 72' extend circumferentially around the rotor hub 60' and the seal ring 72'.

Once the cooling air has reached the plenum 102, the cooling air can enter a number of passages that provide film cooling or impingement cooling for one of the pair of knife edge seals 76. A first film cooling passage 112 provides film cooling along an upstream surface of a forward one of the pair of knife edge seals 76 through a film outlet 114 and a second film cooling passage 116 provides film cooling along an upstream surface of an aft one of the pair of knife edge seals 76 through a film outlet 118. The first and second film cooling passages 112 and 116 extend in a radially outward direction. The film outlets 116 and 118 are directed in a non-perpendicular direction relative to an exterior surface of the knife edge seals 76 to allow the cooling air leaving the outlets 116 and 118 to create a film over the knife edge seals 76 for cooling.

Although the first and second film cooling passages 112 and 116 are shown being circumferentially aligned in the seal ring 72', the first and second cooling passages 112 and 116 could be circumferentially spaced from each other along the seal ring 72'. Additionally, although the illustrated non-limiting embodiment illustrates a specific path for the first and second film cooling passages 112 and 116, other paths could be used depending on the geometry of the seal ring 72' and the cooling needs.

A first impingement cooling passage 120 provides impingement cooling on a downstream surface of the forward knife edge seal 76 through an impingement outlet 122 and a second impingement cooling passage 124 provides impingement cooling on a downstream surface of the aft knife edge seal 76 through an impingement outlet 126. The first and second impingement cooling passages 120 and 124 extend in a radially outward direction. The aft knife edge seal 76 includes an impingement feature 128 that projects downstream from the aft knife edge seal 76 to increase the surface area for the second impingement cooling passage 122 to cool the aft knife edge seal 76.

Although the first and second impingement cooling passages 120 and 124 are shown being circumferentially aligned in the seal ring 72', the first and second impingement cooling passages 120 and 124 could be circumferentially spaced from each other along the seal ring 72'. Additionally, the illustrated non-limiting embodiment illustrates a specific path for the first and second impingement cooling passages 120 and 124, other paths could be used depending on the geometry of the seal ring 72'. Furthermore, the first and second film cooling passages 112 and 116 and the first and second impingement cooling passages 120 and 124 could be in arranged in any pattern or sequence around a circumference of the seal ring 72' to meet the cooling needs of the pair of knife edges seals 76.

The seal ring 72' is installed on the rotor hub 60' in a similar fashion as described above in relation to the seal ring 72 and the rotor hub 60 with the addition of the first seal face 104 on the second axially extending projection 106 on the rotor hub 60' needing to be aligned with the second seal face 108 on the axially forward extending projection 110.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A gas turbine engine comprising:
    a rotor hub including a substantially axially extending projection and a substantially radially extending projection;
    a seal ring including a body portion and at least one knife edge extending outward from the body portion, a recess in the body portion for accepting the substantially axially extending portion of the rotor hub, wherein the seal ring includes at least one cooling passage extending through the seal ring; and
    a lock ring in abutting contact with the seal ring and the substantially radially extending projection on the rotor hub for securing the seal ring to the rotor hub, wherein an axially downstream-most surface on the seal ring is located upstream of a contact surface on the lock ring.

2. The gas turbine engine of claim 1, wherein the at least one cooling passage includes at least one of an impingement cooling passage and a film cooling passage.

3. The gas turbine engine of claim 1, including a plenum at least partially defined by the rotor hub and the seal ring.

4. The gas turbine engine of claim 3, including a feed passage in the rotor hub in fluid communication with the plenum.

5. The gas turbine engine of claim 1, wherein the at least one cooling passage extends in a radially outward direction.

6. The gas turbine engine of claim 1, wherein a radially innermost surface on the seal ring is located radially outward from a radially outermost surface on the substantially radially extending projection.

7. A gas turbine engine comprising,
    a rotor hub including a substantially axially extending projection and a substantially radially extending projection;
    a seal ring including a body portion and at least one knife edge extending outward from the body portion, a recess in the body portion for accepting the substantially axially extending portion of the rotor hub, wherein the seal ring includes at least one cooling passage extending through the seal ring;
    a lock ring in abutting contact with the seal ring and the substantially radially extending projection on the rotor hub for securing the seal ring to the rotor hub; and
    a rotor disk supporting a plurality of rotor blades, wherein the rotor hub abuts the rotor disk at an axially forward end and a spool on an axially downstream end.

8. The gas turbine engine of claim 7, wherein the rotor hub tapers from an axially upstream end toward an axially downstream end.

9. The gas turbine engine of claim 7, wherein an axially downstream-most surface on the seal ring is located upstream of a contact surface on the lock ring.

10. A seal assembly for a gas turbine engine comprising:
    a seal ring including:
        a body portion including a recess in the body portion for accepting a portion of a rotor hub on an axially upstream end;
        at least one knife edge extending outward from the body portion; and
        at least one cooling passage extending through the seal ring; and
    a stop extending from a downstream end of the body portion for engaging a lock ring; and the lock ring in abutting contact with the seal ring, wherein an axially downstream-most surface on the seal ring is located upstream of a contact surface on the lock ring.

11. The seal assembly of claim 10, wherein the rotor hub includes a substantially axially extending projection and a substantially radially extending projection, wherein the substantially axially extending projection is accepted within the recess in the seal ring.

12. The seal assembly of claim 10, wherein the at least one cooling passage includes at least one of an impingement cooling passage and a film cooling passage.

13. The seal assembly of claim 11, including a plenum at least partially defined by the rotor hub and the seal ring.

14. The seal assembly of claim 13, including a feed passage in the rotor hub in fluid communication with the plenum.

15. The seal assembly of claim 11, wherein the rotor hub includes a rotor disk contact surface on an axially upstream portion for contacting a rotor disk and a spool contact surface on an axially downstream portion for contacting a spool.

16. The seal assembly of claim 10, wherein the at least one cooling passage extends in a radially outward direction.

17. The seal assembly of claim 10, including a rotor hub having a substantially axially extending projection and a substantially radially extending projection, wherein the lock ring is in abutting contact with the substantially radially extending projection on the rotor hub for securing the seal ring to the rotor hub.

* * * * *